US012585815B2

(12) United States Patent
Huang et al.

(10) Patent No.: US 12,585,815 B2
(45) Date of Patent: Mar. 24, 2026

(54) INFORMATION MANAGEMENT SYSTEM AND METHOD FOR COMMUNICATION APPLICATION, AND DISPLAY TERMINAL

(71) Applicant: BIGO TECHNOLOGY PTE. LTD., Singapore (SG)

(72) Inventors: Rong Huang, Guangzhou (CN); Yanshan Feng, Guangzhou (CN); Tiejun Wang, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 581 days.

(21) Appl. No.: 17/780,430

(22) PCT Filed: Aug. 7, 2020

(86) PCT No.: PCT/CN2020/107961
§ 371 (c)(1),
(2) Date: May 26, 2022

(87) PCT Pub. No.: WO2021/103649
PCT Pub. Date: Jun. 3, 2021

(65) Prior Publication Data
US 2023/0004673 A1 Jan. 5, 2023

(30) Foreign Application Priority Data

Nov. 29, 2019 (CN) .......................... 201911204703.5

(51) Int. Cl.
*G06F 21/62* (2013.01)
*G06F 16/957* (2019.01)

(52) U.S. Cl.
CPC ...... *G06F 21/6245* (2013.01); *G06F 16/9577* (2019.01)

(58) Field of Classification Search
CPC ............. G06F 21/6245; G06F 16/9577; G06F 16/958; G06Q 50/01
(Continued)

(56) References Cited

U.S. PATENT DOCUMENTS

| | | | |
|---|---|---|---|
| 8,910,076 | B2 | 12/2014 | Fernandez |
| 2003/0105826 | A1 | 6/2003 | Mayraz |

(Continued)

FOREIGN PATENT DOCUMENTS

| | | |
|---|---|---|
| CN | 104636055 A | 5/2015 |
| CN | 106325740 A | 1/2017 |

(Continued)

OTHER PUBLICATIONS

International Search Report of the International Searching Authority for State Intellectual Property Office of the People's Republic of China in PCT application No. PCT/CN2020/107961 issued on Nov. 12, 2020, which is an international application corresponding to this U.S. application.

(Continued)

*Primary Examiner* — Hope C Sheffield
(74) *Attorney, Agent, or Firm* — Kolitch Romano Dascenzo Gates LLP

(57) ABSTRACT

Provided are an information management system and method for a communication application, and a display terminal. The system includes a personal information display module and a posted information display module; the personal information display module is configured to display personal information of a poster; and the posted information display module is configured to dynamically display a plurality of posted contents contained in a moment posted by the poster at current time.

19 Claims, 3 Drawing Sheets

(58) Field of Classification Search
USPC .......................................................... 715/273
See application file for complete search history.

(56) References Cited

U.S. PATENT DOCUMENTS

| | | | | |
|---|---|---|---|---|
| 2009/0217320 A1* | 8/2009 | Aldrey | ............... | H04N 21/4318 |
| | | | | 725/37 |
| 2011/0012929 A1 | 1/2011 | Grosz et al. | | |
| 2012/0079429 A1* | 3/2012 | Stathacopoulos | ...... | H04N 21/84 |
| | | | | 715/830 |
| 2013/0073976 A1* | 3/2013 | McDonald | .......... | G06F 16/9577 |
| | | | | 715/739 |
| 2014/0067702 A1 | 3/2014 | Rathod | | |
| 2014/0089816 A1 | 3/2014 | Dipersia et al. | | |
| 2015/0012449 A1 | 1/2015 | Jackson et al. | | |
| 2015/0195095 A1* | 7/2015 | Gillead | ................. | H04L 63/083 |
| | | | | 715/753 |
| 2015/0205513 A1 | 7/2015 | Jin et al. | | |
| 2015/0301729 A1* | 10/2015 | Wang | .................... | G06F 3/0485 |
| | | | | 715/707 |
| 2016/0196244 A1* | 7/2016 | Greenberg | .......... | G06F 3/04842 |
| | | | | 715/205 |
| 2018/0262812 A1 | 9/2018 | Chai et al. | | |

FOREIGN PATENT DOCUMENTS

| | | | |
|---|---|---|---|
| CN | 108959558 A | 12/2018 | |
| CN | 109040159 A | 12/2018 | |
| CN | 109146530 A | 1/2019 | |
| CN | 109165361 A | 1/2019 | |
| CN | 110391970 A | 10/2019 | |
| CN | 110399562 A | 11/2019 | |
| CN | 110968814 A | 4/2020 | |
| RU | 2613724 C2 | 3/2017 | |
| RU | 2628139 C2 | 8/2017 | |
| WO | 2014171676 A1 | 10/2014 | |

OTHER PUBLICATIONS

The State Intellectual Property Office of People's Republic of China, First Office Action in Patent Application No. CN201911204703.5 issued on May 8, 2021, which is a foreign counterpart application corresponding to this U.S. Patent Application, to which this application claims priority.
The State Intellectual Property Office of People's Republic of China, Second Office Action in Patent Application No. CN201911204703.5 issued on Aug. 13, 2021, which is a foreign counterpart application corresponding to this U.S. Patent Application, to which this application claims priority.
The State Intellectual Property Office of People's Republic of China, Third Office Action in Patent Application No. CN201911204703.5 issued on Nov. 16, 2021, which is a foreign counterpart application corresponding to this U.S. Patent Application, to which this application claims priority.
Notification to Grant Patent Right for Invention of Chinese application No. 201911204703.5 issued on Feb. 23, 2022.
Extended European Search Report Communication Pursuant to Rule 62 EPC, dated Jan. 5, 2023 in Patent Application No. EP 20891803.7, which is a foreign counterpart application to which this application claims priority.
Russian Federal Service for Intellectual Property, Second Office Action in Patent Application No. 2022116909 issued on Apr. 14, 2023, which is a foreign counterpart application corresponding to this U.S. Patent Application.

* cited by examiner

Post terminal                    Server                    Display termina

INFORMATION MANAGEMENT SYSTEM AND METHOD FOR COMMUNICATION APPLICATION, AND DISPLAY TERMINAL

CROSS-REFERENCE TO RELATED APPLICATION

This application is a U.S. national stage of international application No. PCT/CN2020/107961, filed on Aug. 7, 2020, which claims priority to Chinese Patent Application No. 201911204703.5, filed on Nov. 29, 2019 and entitled "INFORMATION MANAGEMENT SYSTEM AND METHOD FOR COMMUNICATION APPLICATION AND DISPLAY TERMINAL", the disclosures of which are herein incorporated by reference in their entireties.

TECHNICAL FIELD

Embodiments of the present application relate to the field of network communications, for example, to an information management system and method for a communication application, and a display terminal.

BACKGROUND

With the rapid development of the mobile Internet, more and more users can post corresponding moments information, such as text, a link, a picture or a video, with a variety of social software so as to express the moods of the users themselves. At this time, in order to more conveniently read moments posted by other users, in the social media software, the moments containing various types of content posted by the users at the same time may be displayed in one information card, such as the moments displayed in a moment space set in a chat application.

SUMMARY

Embodiments of the present application provide an information management system and method for a communication application, and a display terminal. While ensuring a relatively low information density of displaying a moment, the number of posted contents contained in the moment posted by a poster is increased, and the complexity of an information display layout is reduced.

An embodiment of the present application provides an information management system for a communication application. The system includes a personal information display module and a posted information display module; the personal information display module is configured to display personal information of a poster; and the posted information display module is configured to dynamically display a plurality of posted contents contained in a moment posted by the poster at current time.

An embodiment of the present application provides an information management method for a communication application. The method includes the following steps which are not executed in order:

displaying an information post section of a poster in an information stream page;

storing personal information of the poster to a personal information display module of the information post section; and dynamically storing a plurality of posted contents contained in a moment posted by the poster at current time to a posted information display module of the information post section.

An embodiment of the present application provides a display terminal. The display terminal includes:

one or more processors; and a memory apparatus configured to store one or more programs;

wherein the at least one processor, when loading and running the at least one processor, is caused to perform the information management method for the communication application in any embodiment of the present application.

An embodiment of the present application provides a communication system, including a post terminal, a server, and a display terminal in any embodiment of the present application.

The post terminal is configured to upload a moment posted by a poster at current time to the server; and the server is configured to search for an associated user of the poster, issue personal information of the poster to the display terminal of the associated user, and dynamically issue a posted content at a viewport of the display terminal in the moment posted by the poster at the current time to the display terminal.

An embodiment of the present application provides a computer-readable storage medium storing at least one computer program, wherein the at least one computer program, when loaded and run by a processor, causes the processor to perform the information management method for the communication application in any embodiment of the present application.

DETAILED DESCRIPTION

The present application is described below in combination with the accompanying drawings and embodiments. The embodiments described here are merely to explain the present application and not intended to limit the present application. In addition, for the purpose of facilitating the description, not all of structures related to the present application are illustrated only in the accompanying drawings.

With increased screen size and more and more diversified information carriers in a user equipment (UE), due to the limitation of an information card, a limited number of contents contained can be displayed in a moment posted by a user. On the other hand, when the contents contained in the moment are excessive, a higher information density is caused when more contents are displayed, which can increase the visual burden of a user.

In the embodiments of the present application, for the problem of limitation to displaying posted contents contained in a moment, a new solution for displaying a moment in an information management system is provided, so as to dynamically display a plurality of posted contents contained in the moment posted by a poster, thus reducing the complexity of an information display layout; at the same time, each of posted contents in the posted moment is displayed in a dynamic changing manner, so that it is not necessary to display all the posted contents at one time in a display interface, thus increasing the number of posted contents contained in the moment posted by the poster on the basis of ensuring a lower information density of displaying moments.

Embodiment I

Figure 1:
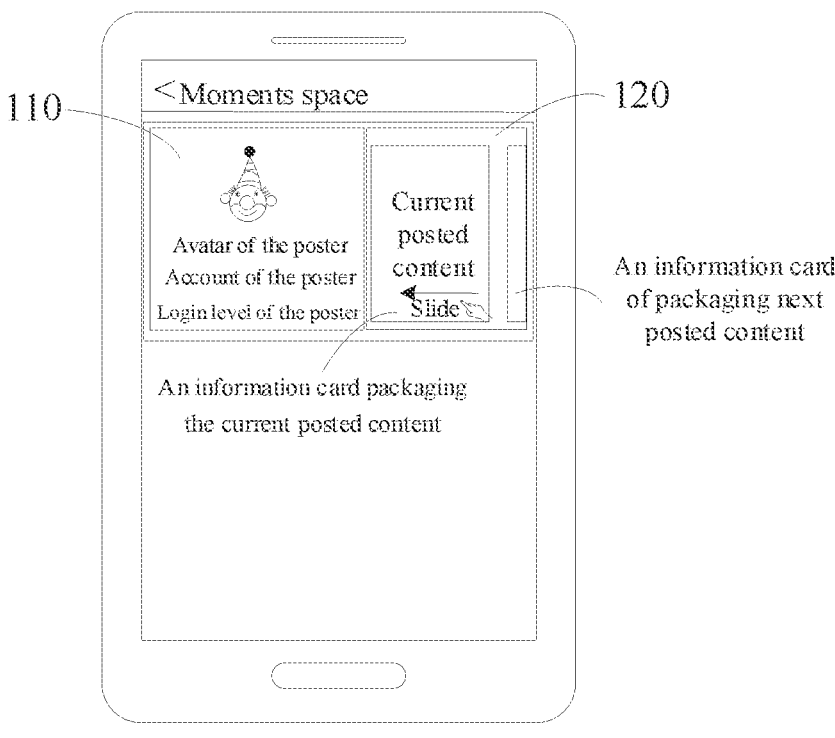
FIG. 1 is a schematic diagram of an interface of a communication application in an information management system for the communication application provided in Embodiment I of the present application.

FIG. 1 is a schematic diagram of an interface of a communication application in an information management system for the communication application provided in Embodiment I of the present application. This embodiment is applicable to a situation where moments posted by a poster are displayed through a communication application in this embodiment. Referring to FIG. 1, an information management system in this embodiment may include a personal information display module 110 and a posted information display module 120.

The personal information display module 110 is configured to display personal information of a poster; and the posted information display module 120 is configured to dynamically display a plurality of posted contents contained in a moment posted by the poster at current time.

The communication application in this embodiment is a newly developed chat application program, and display styles of the moments posted by a plurality of posters in a moment space are pre-set during the development of the chat application program; and correspondingly, a personal information display module 110 and posted information display module 120 exist in the each display style of moments. In order to learn about information of the posters, in this embodiment, personal information of a poster of each piece of moments may be displayed through the personal information display module 110. At the same time, in order to ensure the integrality of displaying a plurality of posted contents in the moment, the plurality of posted contents contained in the moment is dynamically displayed through the posted information display module 120. In this embodiment, only moments posted by friends of a current user in the above communication application and strangers having an association relationship with the current user are displayed in a moment space of a client of the current user. For example, the association relationship may be as follows: the current user and a stranger are in the same group or concern about the same topic.

Configuring the communication application to the client of the current user is taken as an example for illustration. After the communication application is enabled on the current user side, when a server receives a moment posted by a friend of the current user and a stranger having an association relationship with the current user, the server issues, personal information of the posters and a plurality of posted contents contained in the moment posted by the posters at the current time to the client of the current user. At this time, a display space corresponding to the posters is generated in a moment space of the client of the current user side, and includes the personal information display module 110 and the posted information display module 120. As shown in FIG. 1, the personal information display module 110 is configured to display the personal information of the posters issued by the server. The personal information may include identifier information of the poster in various dimensions, such as an avatar of the poster, a user name in the communication application, and a login level in the communication application. The posted information display module 120 is configured to dynamically display the plurality of posted contents issued by the server and contained in the moments posted by the posters at the current time. In this embodiment, the moment posted by each poster at the current time may include various types of posted content such as a text, a picture, a video, and a link.

The posted information display module 120 for dynamically displaying the plurality of posted contents in this embodiment is illustrated below.

In this embodiment, in order to ensure the uniformity of dynamic displaying of the plurality of posted contents, before the posted information display module 120 dynamically displays the plurality of posted contents contained in the moments posted by the posters at the current time, the plurality of posted contents are first packaged in an information card in a preset format, so that the plurality of posted contents contained in the moments posted by the posters at the current time are uniformly set to be a uniform format, which improves the regularity of dynamic displaying of the plurality of posted contents, reducing the complexity of a display interface, and achieving the purpose of reducing visual noise.

At the same time, a display order corresponding to the plurality of posted contents is determined based on a post order of the plurality of posted contents within the moment posted at the current time. That is, when the poster posts a corresponding moment, the poster uploads the plurality of posted contents contained in the moment to the server. The post order (an upload order) of the plurality of posted contents within the moment at the current time may be used as the display order of the dynamic displaying of the plurality of posted contents in the information display module 120. Correspondingly, the posted information display module 120 displays the first posted content based on the display order when dynamically displaying the plurality of posted contents contained in the moment posted by the poster at the current time. In the subsequent stage, in response to detecting a trigger operation of a user, each of posted contents can be correspondingly displayed in a dynamic changing manner based on the display order.

Exemplarily, in the case that the plurality of posted contents are dynamically displayed in the posted information display module 120 based on the trigger operation of the user, the trigger operation may be set to be in various forms. In this embodiment, an introduction is made through the following two cases:

In a first case: after the first posted content is initially displayed in the posted information display module 120, if the current user needs to read other posted contents, the current user can click or touch a blank position (such as a blank position on the right side of an information card corresponding to the posted content) corresponding to the posted content and displayed in the posted information display module 120 to instruct a dynamic skip to a next posted content, and the currently displayed posted content is dynamically replaced, based on the display order corresponding to the posted contents, with the next posted content corresponding to the posted content. Therefore, in this embodiment, a plurality of posted contents are displayed by continuous dynamic skips based on the trigger operation of the user.

In a second case: the posted content, located at a viewport, in the moment posted by the posted at the current time can be dynamically displayed in the posted information display module 120 based on a slide operation of a user. The viewport is a viewing area, on which the current user can browse data in multiple interfaces, in the client of the current user. After the plurality of posted contents are packaged in the information card in the preset format, the server can arrange, based on the display order corresponding to the plurality of posted contents, the plurality of packaged posted contents in a manner matched with the sliding manner. For example, in the case that the user dynamically displays the plurality of posted contents by sliding in a left-right direction, the plurality of packaged posted contents are arranged left and right; in the case that the user dynamically displays the plurality of posted contents by sliding in an up-down direction, the plurality of packaged posted contents are arranged up and down. The client of the current user determines, based on the slide operation of the user, sliding coordinates of the viewport corresponding to the slide operation, and then uploads the sliding coordinates of the viewport to the server. The server determines a posted content located at the sliding coordinates of the viewport from the plurality of arranged posted contents contained in the moment posted by the poster at the current time and then issues the posted content located at the viewport to the client of the current user, so that the posted content issued at this time is displayed in the posted information display module 120. Therefore, in this embodiment, the server can continuously issue, based on the slide operation of the user, the posted content located at the viewport of the client to the client of the current user, so that the posted information display module of the client of the current user dynamically displays the plurality of posted contents based on the slide operation of the user.

Exemplarily, when the plurality of posted contents dynamically displayed are determined based on the slide operation of the user, the posted information display module 120 can be configured to display, at the viewport, an information card corresponding to the current posted content and edges of an information card corresponding to the next posted content, and the user slides a screen from right to left to constantly display the next posted content, instead of displaying all the posted contents contained in the moment posted by the poster at the current time. The user reads unlimited posted contents by transverse sliding, thereby avoiding a limitation to the number of posted contents in the moment posted by the poster at each time. The number of posted contents contained in the moment posted by the poster is increased on the basis of ensuring a lower information density of displaying moments.

Meanwhile, in this embodiment, each piece of moments displayed in the moment space is a piece of Feed information. In this embodiment, a transverse space used for dynamically displaying a plurality of posted contents in a single piece of Feed information is enlarged. It is ensured that the overall information amount in the single piece of Feed information is not decreased while reducing the information density.

According to the technical solution provided in this embodiment, the personal information of the poster is specifically displayed through the personal information display module, and the posted contents contained in the moment posted by the poster at the current time is displayed through the posted information display module. That is, in the case that the piece of moments posted by the poster at certain time contains a plurality of posted contents, each of posted contents can be displayed in a dynamic changing manner in the posted information display module, without limiting the number of posted contents in the moment posted by the poster. Meanwhile, each of posted contents is displayed in the dynamic changing manner, instead of displaying all the posted contents in the display interface at one time, so that the number of posted contents contained in the moment posted by the poster is increased while ensuring a lower information density of displaying moments; and the complexity of the information display layout is reduced by dynamically displaying the plurality of posted contents.

Embodiment II

Figure 2A:
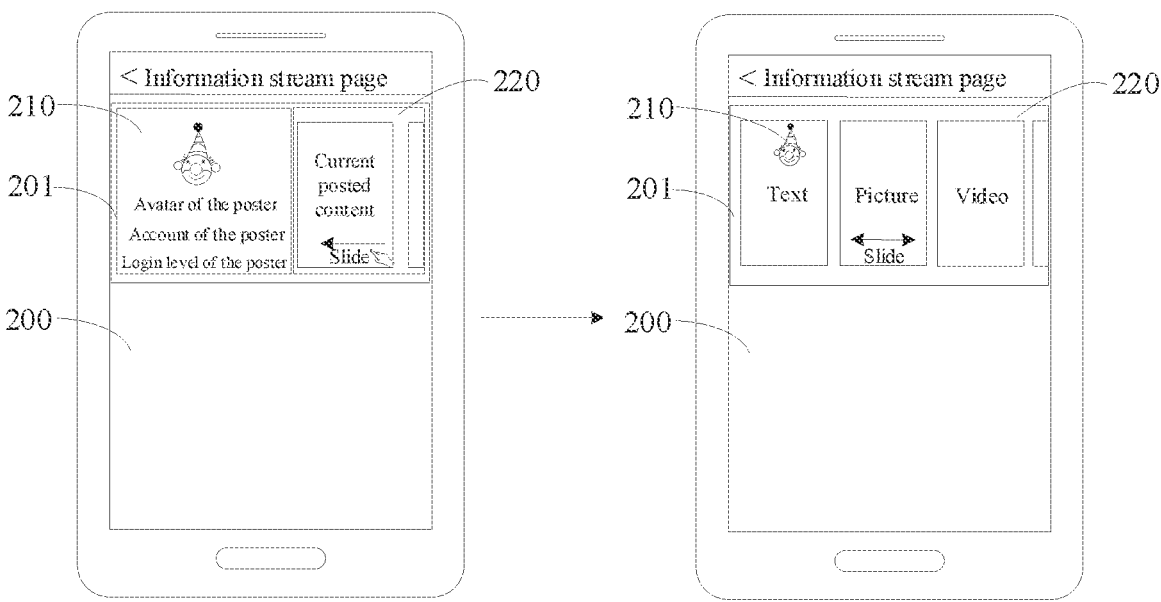
FIG. 2A is a schematic diagram of an interface of a communication application in an information management system for the communication application provided in Embodiment II of the present application.
Figure 2B:
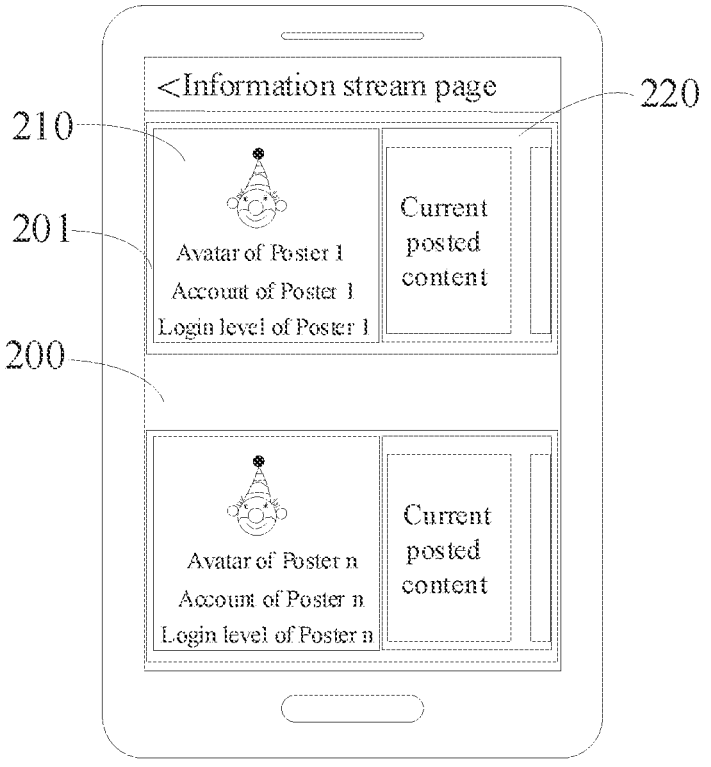
FIG. 2B is a schematic diagram of an interface of a communication application in another information management system for the communication application provided in Embodiment II of the present application.

FIG. 2A is a schematic diagram of an interface of a communication application in an information management system for the communication application provided in Embodiment II of the present application, and FIG. 2B is a schematic diagram of an interface of a communication application in another information management system for the communication application provided in Embodiment II of the present application. This embodiment is described on the basis of the above embodiment. This embodiment mainly explains and describes display styles of the personal information display module 210 and the posted information display module 220 in the communication application during dynamic displaying of a plurality of posted contents.

Referring to FIG. 2A, the communication application in this embodiment may further include an information stream page 200. The information stream page 200 is configured to display an information post section 201 of a poster. The information post section 201 is provided with a personal information display module 210 and a posted information display module 220.

Exemplarily, the information stream page 200 mainly displays Feed information correspondingly indicated by a moment posted, at different time, by a poster having a correspondence relationship with a current user. The Feed information is composed of personal information of the poster and posted contents contained in the moment. Each piece of Feed information constitutes, in the information stream page 200, the information post section 201 in this embodiment. The information post section 201 packages information displayed by the personal information display module 210 and the posted information display module 220 in a unified way, so as to distinguish the same from moments posted by other posters.

In this embodiment, in order to ensure the integrality of the personal information of the poster, during setting of a display style of the Feed information, a display area of personal information display module 210 can be set to be larger than that of the posted information display module 220 in the information post section 201. For example, ⅔ of the display area on the left side in the information post section 201 is set to be the personal information display module 210. A large enough space is reserved in the information post section 201 to display the personal information of the poster, and the personal information of the poster in two or more dimensions is displayed in the personal information display module 210, such as an avatar of the poster, a user name in the communication application, and a login level in the communication application. Meanwhile, a large blank on the left side in the information post section 201 also ensures that the personal information of the poster effectively attracts the attention of the current user. The personal information of the poster is fully highlighted while displaying the moment posted by the poster.

Meanwhile, the posted information display module 220 on the right side in the information post section 201 can display an information card corresponding to first posted content in the moment posted by the poster at the current time and edges of an information card corresponding to second posted content, so as to prompt the current user that there are a plurality of posted contents in the moment posted by the poster. The current user can make a transverse slide to display, in a dynamic changing manner in the posted information display module 220, the plurality of posted contents posted by the poster at the current time. Exemplarily, when the current user transversely slides the posted contents in the posted information display module 220, other posted contents are constantly move and appear from the right edge, so that other posted contents are correspondingly displayed within the range of a screen to reduce the information density on the screen, relieve the visual pressure of the current user, and improve the reading efficiency.

In addition, in order to ensure the comprehensiveness of the plurality of posted contents during slide displaying, in this embodiment, if it is detected that a plurality of posted contents are dynamically displayed in the posted information display module 220, that is, if a slide operation of the user from right to left is detected, and other posted contents constantly move from the right edge and appear in the viewport for displaying, the personal information of the poster in a target dimension can be zoomed out, and the personal information of the poster in other dimensions is hidden. The personal information display module 210 can display zoomed-out personal information of the poster in a target dimension and hide the personal information in other dimensions, as shown in FIG. 2A. At this time, the posted information display module 220 dynamically displays the plurality of posted contents in the entire display area of the information post section 201.

Exemplarily, when the current user executes the transverse slide operation in the information post section 201, more information cards packaged with the corresponding posted content move from the right edge of the information post section 201 to left and appear in the range of the screen, and the personal information of the poster within the personal information display module 210 is controlled to be appropriately hidden and zoomed out, so as to leave a screen space for more posted contents that appear by sliding, such as zooming out the avatar of the poster and hiding the rest personal information. Since the transverse space is fully used, while reducing the displayed information density, this embodiment ensures that the overall information amount contained in the moment posted by the poster is not decreased.

In another aspect, as shown in FIG. 2B, the information stream page 200 of this embodiment displays moments posted by a plurality of posters at different time, that is, a plurality of information post sections 201 are displayed. The moments may be moments posted by the same poster at different time, or may be moments posted by different posters at different time. The information post sections 201 of the poster are arranged in the information stream page 200 in sequence based on latest post states of the plurality of information post sections 201. The latest post state may refer to post time of comments.

According to the technical solution provided in this embodiment, by arranging the personal information display module and the posted information display module at the display area in the information post section, the personal information of the poster is highlighted to effectively attract the attention of the current user. Meanwhile, when the posted information display module in the information post section dynamically displays a plurality of posted contents, the personal information display module displays the zoomed-out personal information of the poster in the target dimension and hides the personal information in other dimensions, so as to fully use the transverse space for displaying the posted content, without limiting the number of posted contents in the moment posted by the poster. Each of posted contents is displayed in a dynamic changing manner through the transverse sliding, instead of displaying all the posted contents at one time in the display interface, thus increasing the number of posted contents contained in the moment posted by the poster while ensuring a lower information density of displaying moments. The complexity of an information display layout is reduced by dynamically displaying a plurality of posted contents.

Embodiment III

Figure 3:
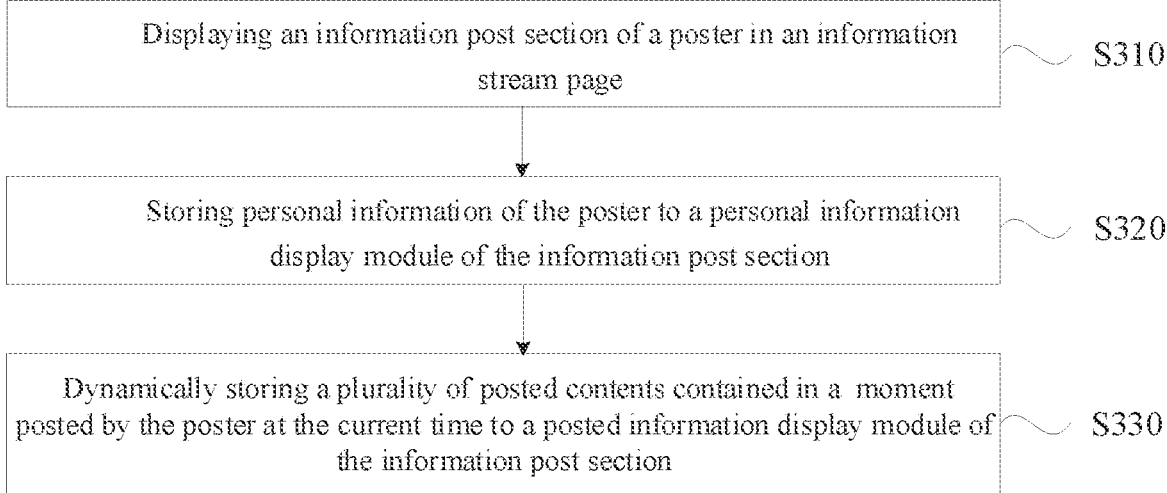
FIG. 3 is a flow-chart of an information management method for a communication application provided in Embodiment III of the present application.

FIG. 3 is a flowchart of an information management method for a communication application provided in Embodiment III of the present application. This embodiment is applicable to a situation where a moment posted by a poster are displayed through a communication application in this embodiment. The information management method for a communication application provided in this embodiment can be executed by the device provided in the embodiment of the present application. The device may be any user terminal configured with the communication application, such as a mobile phone, a flat computer, or a palmtop.

As shown in FIG. 3, the method may include the following steps which are not executed in order:

In S310, an information post section of a poster is displayed in an information stream page.

After the communication application is enabled on a current user side, when a server receives a moment posted by a friend of the current user and a stranger having an association relationship with the current user, the server issues, to a client of the current user, personal information of the posters and a plurality of posted contents contained in the moments posted by the posters at the current time. Correspondingly, in order to display the personal information and moment of the poster at corresponding moment display positions, the client of the current user interposes, to a preset information stream page in the communication application, an information post section configured to display the moments posted by the posters at this time. A personal information display module and a posted information display module corresponding to the poster are present in the information post section, so as to subsequently display corresponding content at specified positions.

In S320, personal information of the poster is stored in a personal information display module of the information post section.

Optionally, after receiving the personal information of the poster and the plurality of posted contents contained in the moment posted by the poster at the current time issued by the server, the client of the current user screens out the personal information of the poster and correspondingly store the screened personal information of the poster to the personal information display module of the information post section. The personal information of the poster may include personal information in two or more dimensions, such as the avatar of the poster, the user name in the communication application, and the login level in the communication application.

In S330, a plurality of posted contents contained in the moment posted by the poster at the current time is dynamically stored in a posted information display module of the information post section.

Optionally, after receiving the personal information of the poster and the plurality of posted contents contained in the moment posted by the poster at the current time issued by the server, the client of the current user screens out the posted contents contained in the moment posted by the poster at the current time and dynamically store the posted content to the posted information display module of the information post section. At this time, the moment posted by the poster at the current time may include a text, a picture, a video, a link, and other various types of posted content.

In this embodiment, the dynamically storing posted contents contained in the moment posted by the poster at the current time to the posted information display module of the information post section may include: packaging the plurality of posted contents contained in the moment posted by the poster at the current time in an information card in a preset format; and determining in real time, in response to a slide operation of the user, a posted content at a viewport in the moment, and dynamically storing the posted content at the viewport to the posted information display module of the information post section.

In this embodiment, in order to ensure the uniformity of dynamic displaying of the plurality of posted contents, after the plurality of posted contents contained in the moments posted by the posters at the current time are screened out, the plurality of posted contents are first packaged in the information card in the preset format, so that each of posted contents contained in the moments posted by the posters at the current time is uniformly set to be one uniform format, which improves the regularity of dynamic displaying of the plurality of posted contents, reducing the complexity of a display interface, and achieving the purpose of reducing visual noise. In addition, a display order corresponding to the posted content is determined based on a post order of the posted content within the moment posted at the current time, that is, when the poster posts a corresponding moment, the poster uploads the plurality of posted contents contained in the moment to the server. The client of the current user may take the post order (an upload order) of the plurality of posted contents within the moment at the current time as the display order of the dynamic displaying of the plurality of posted contents. The server can arrange, based on the display order corresponding to the plurality of posted contents, the plurality of packaged posted contents in a manner matched with the sliding manner. For example, in the case that the user dynamically displays the plurality of posted contents by sliding in a left-right direction, the plurality of packaged posted contents are arranged left and right; in the case that the user dynamically displays the plurality of posted contents by sliding in an up-down direction, the plurality of packaged posted contents are arranged up and down. The client of the current user determines, based on the slide operation of the user, sliding coordinates of the corresponding viewport, and then uploads the sliding coordinates of the viewport to the server. The server determines posted content located at the sliding coordinates of the viewport from the plurality of arranged posted contents contained in the moment posted by the poster at the current time, and then issues the posted content located at the viewport to the client of the current user. The client of the current user stores the posted content at the viewport to the posted information display module of the information post section. Therefore, the server can continuously issue, based on the slide operation of the current user, the posted content at the viewport of the client to the client of the current user, so that the posted information display module of the client of the current user dynamically stores the plurality of posted contents based on the slide operation of the user.

In addition, in order to ensure full use of the transverse space, this embodiment may further include: if it is detected based on the slide operation of the user that a plurality of posted contents are dynamically stored in the posted information display module, the personal information of the poster in a target dimension is zoomed out, and the personal information of the poster in other dimensions are hidden. The posted content, at the viewport, in the moment posted by the poster at the current time is dynamically displayed in the entire display area of the information post section.

In this embodiment, if it is detected that the posted information display module dynamically displays the plurality of posted contents in the information post section, that is, the rest posted content constantly moves from the right edge and appear at the viewport for displaying in response to detecting a slide operation of the user from right to left, the personal information of the poster in the target dimension in the personal information display module is controlled to be zoomed out, and the personal information in other dimensions is hided. At this time, the posted information display module can dynamically display the posted content, at the viewport, in the moment posted by the poster at the current time in the entire display area of the information post section.

Exemplarily, when the current user executes the transverse slide operation in the information post section, more information cards packaged with the corresponding posted content move from the right edge of the information post section to left and appear in the range of the screen, and the personal information of the poster within the personal information display module is controlled to be appropriately hidden and zoomed out, so as to leave a screen space for more posted contents that appear by sliding, such as zooming out the picture of the poster and hiding the rest personal information. Since the transverse space is fully used, while reducing the displayed information density, this embodiment ensures that the overall information amount contained in the moment posted by the poster is not decreased.

According to the technical solution provided in this embodiment, the personal information of the poster is specifically displayed through the personal information display module, and the posted contents contained in the moment posted by the poster at the current time is displayed through the posted information display module. That is, in the case that the moment posted by the poster at a certain time contains a plurality of posted contents, each of posted contents can be displayed in a dynamic changing manner in the posted information display module, without limiting the number of posted contents in the moment posted by the poster. Meanwhile, each of posted contents is displayed in the dynamic changing manner, instead of displaying all the posted contents in the display interface at one time, so that the number of posted contents contained in the moment posted by the poster is increased while ensuring a lower information density of displaying moments; and the complexity of the information display layout is reduced by dynamically displaying the plurality of posted contents.

Embodiment IV

Figure 4:
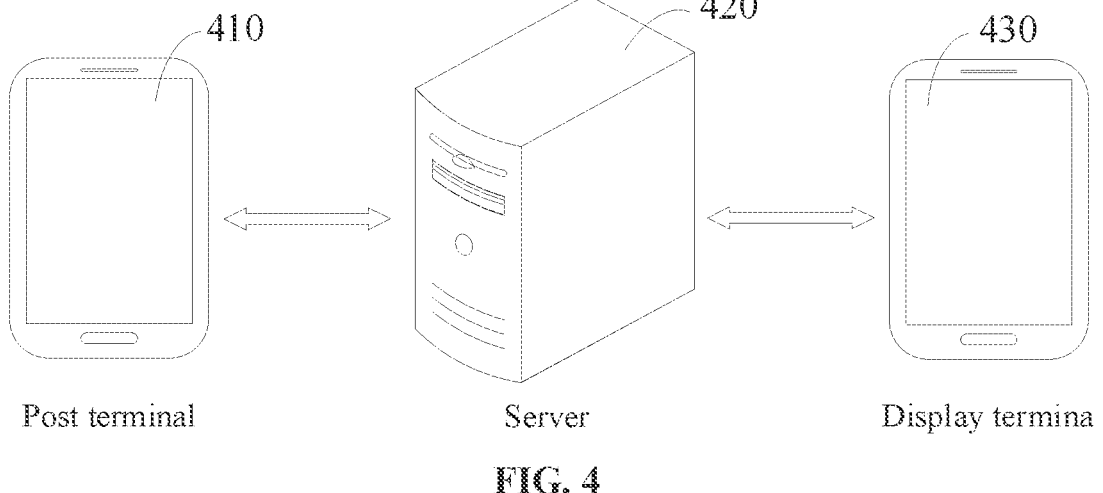
FIG. 4 is a schematic structural diagram of a communication system provided in Embodiment IV of the present application.

FIG. 4 is a schematic structural diagram of a communication system provided in Embodiment IV. Referring to FIG. 4, the communication system may include a post terminal 410, a server 420, and a display terminal 430 for implementing the information management method for a communication application provided in the above embodiment of the present application. They are in communication connection.

The post terminal 410 is configured to upload a moment posted by a poster at current time to the server 420; and the server 420 is configured to search for an associated user of the poster, issue personal information of the poster to the display terminal 430 of the associated user, and dynamically issue a posted content at a viewport of the display terminal 430 in the moment posted by the poster at the current time to the display terminal 430.

A poster posts a moment by the post terminal 410. After receiving the posted moment, the post terminal 410 may upload the posted moment to the server 420 corresponding to the post terminal 410, so that the server 420 forwards a plurality of posted contents contained in the moment posted by the poster at the current time to the display terminal 430 corresponding to the post terminal 410 for displaying. The server 420 may find out an user associated with the poster based on identity information of the poster, such as a friend of the poster and a stranger located in the same group as the poster, so that the server issues, to the display terminal 430 of the associated user, a posted content, at a viewport of the display terminal 430, in the moment posted by the poster at the current time and the personal information of the poster, and the display terminal 430 displays the personal information of the poster and dynamically displays the plurality of posted contents in the moment posted by the poster at the current time.

In addition, the server 420 in this embodiment is configured to dynamically issue the posted content, at the viewport of the display terminal 430 in the moment posted by the poster at the current time to the display terminal 430 by: determining, in response to a slide operation reported by the display terminal 430, a viewport position corresponding to the slide operation, and issuing the posted content, at the viewport in the moment posted by the poster at the current time to the display terminal 430 based on the viewport position.

According to the technical solution provided in this embodiment, the server is configured to dynamically issue, the posted content at the viewport of the display terminal in the moment posted by the poster at the current time to the display terminal, so that the display terminal dynamically displays the plurality of posted contents in the moment posted by the poster, and each of posted contents can be displayed in the posted information display module in a dynamic changing manner, without limiting the number of posted contents in the moment posted by the poster. Meanwhile, each of posted contents is displayed in the dynamic changing manner, instead of displaying all the posted contents in the display interface at one time, so that the number of posted contents contained in the moment posted by the poster is increased while ensuring a lower information density of displaying moments; and the complexity of the information display layout is reduced by dynamically displaying the plurality of posted contents.

Embodiment V

Figure 5:
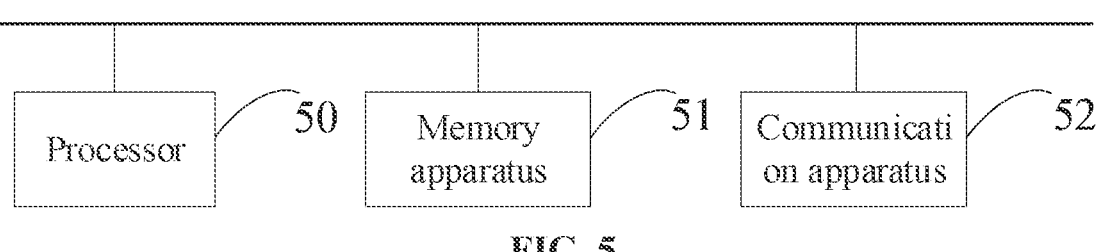
FIG. 5 is a schematic structural diagram of a display terminal provided in Embodiment V of the present application.

FIG. 5 is a schematic structural diagram of a display terminal provided in Embodiment V of the present application. As shown in FIG. 5, the display terminal includes a processor 50, a memory apparatus 51, and a communication apparatus 52. There may be one or more processors 50 in the display terminal. In FIG. 5, one processor 50 is taken as an example. The processor 50, the memory apparatus 51, and the communication apparatus 52 in the display terminal may be connected through a bus or in other ways. In FIG. 5, bus connection is taken as an example.

The memory apparatus 51 is used as a computer-readable storage medium that is set to be storage software, a computer-executable program and a module, such as a program instruction/module corresponding to the information management method for a communication application provided in the embodiment of the present application. The processor 50 runs software, instructions, and modules stored in the memory apparatus 51, so as to execute various functional applications and data processing of a device, thus implementing the information management method for a communication application.

The memory apparatus 51 may mainly include a program storage area and a data storage area. The program storage area may store an operating system and an application program required by at least one function. The data storage area may store data established according to the use of a terminal, etc. In addition, the memory apparatus 51 may include a high-speed random access memory, and may further include a non-transitory memory, such as at least one magnetic disk storage device, a flash memory device, or other non-transitory solid-state storage devices. In some examples, the memory apparatus 51 may include a memory remotely provided with respect to the processor 50, and these remote memories may be connected to the display terminal over a network. Examples of the above network include, but are not limited to, the Internet, an intranet, a local area network, a mobile communication network, and combinations thereof.

The communication apparatus 52 is configured to achieve inter-device network connection or mobile data connection The display terminal provided in this embodiment can be configured to implement the information management method for a communication application provided in any of the above embodiments, and has corresponding functions.

Embodiment VI

Embodiment VI of the present application further provides a computer-readable storage medium which stores at least one computer program. The at least one computer program, when loaded and run by a processor, causes the processor to perform the information management method for a communication application in any of the above embodiments. The method may include the following steps which are not executed in order:

displaying an information post section of a poster in an information stream page;

storing personal information of the poster to a personal information display module of the information post section; and dynamically storing a plurality of posted contents, contained in the moment posted by the poster at the current time, to a posted information display module of the information post section.

Of course, the storage medium provided in this embodiment includes the computer-executable instructions. The computer-executable instructions are not limited to operations of the method described above, and may also perform related operations in the information management method for a communication application provided in any embodiment of the present application.

Through the descriptions of the above implementations, those skilled in the art can clearly understand that the present application can be implemented by means of software and general hardware, and of course, can also be achieved by hardware. The technical solutions of the present application can be essentially embodied in the form of a software product, and the computer software product can be stored in a computer-readable storage medium, such as a computer floppy disk, a read-only memory (ROM), a random access memory (RAM), a flash memory (FLASH), a hard disk or an optical disk, etc., including multiple instructions to make a computer device (which can be a personal computer, server, or network device, etc.) execute the method of the multiple embodiments of the present application.

What is claimed is:

1. An information management system for a communication application, comprising:
  a personal information display module and a posted information display module, wherein the personal information display module is configured to display personal information of a poster, and the posted information display module is configured to dynamically display a plurality of posted contents contained in a moment posted by the poster at a current time; and
  wherein the plurality of posted contents contained in the moment posted at the current time, displayed in the posted information display module, are dynamically displayed at a viewport based on an upload order in which the plurality of posted contents are uploaded to a server within the current time,
  wherein the posted information display module displays a first information card corresponding to a first posted content in the moment posted by the poster at the current time and edges of a second information card corresponding to a second posted content; in a case where a user performs a slide operation, other posted contents constantly move and appear from a right edge of the posted information display module to be correspondingly displayed within a range of the posted information display module, sliding coordinates of the viewport corresponding to the slide operation are determined based on the slide operation and are uploaded to the server, and the server determines a posted content located at the sliding coordinates of the viewport from the plurality of posted contents contained in the moment posted by the poster at the current time.

2. The information management system according to claim 1, wherein the posted information display module is configured to dynamically display the plurality of posted contents packaged in a corresponding information card in a preset format.

3. The information management system according to claim 1, wherein the posted information display module is configured to dynamically display, in response to the slide operation of the user, a posted content at the viewport in the moment posted by the poster at the current time.

4. The information management system according to claim 1, further comprising: an information stream page, wherein the information stream page is configured to display an information post section of the poster, the information post section being provided with the personal information display module and the posted information display module.

5. The information management system according to claim 4, wherein in the information post section, a first display area of the personal information display module is larger than a second display area of the posted information display module.

6. The information management system according to claim 4, wherein the personal information of the poster in various dimensions is displayed in the personal information display module.

7. The information management system according to claim 6, wherein in the case that the plurality of posted contents are dynamically displayed in the posted information display module, the personal information display module is further configured to dynamically display zoomed-out personal information of the poster in a target dimension and hide personal information in other dimensions; and the posted information display module is configured to dynamically display the plurality of posted contents in an entire display area of the information post section.

8. The information management system according to claim 4, wherein in the case that the information stream page displays a plurality of information post sections, the plurality of information post sections are arranged in sequence in the information stream page based on latest post states of the plurality of information post sections.

9. An information management method for a communication application, comprising:
  displaying an information post section of a poster in an information stream page;
  storing personal information of the poster to a personal information display module of the information post section; and
  dynamically storing a plurality of posted contents contained in a moment posted by the poster at a current time to a posted information display module of the information post section;
  wherein the plurality of posted contents contained in the moment posted at the current time, displayed in the posted information display module, are dynamically displayed at a viewport based on an upload order in which the plurality of posted contents are uploaded to a server within the current time,
  wherein the posted information display module displays a first information card corresponding to a first posted content in the moment posted by the poster at the current time and edges of a second information card corresponding to a second posted content; in a case where a user performs a slide operation, other posted contents constantly move and appear from a right edge of the posted information display module to be correspondingly displayed within a range of the posted information display module, sliding coordinates of the viewport corresponding to the slide operation are determined based on the slide operation and are uploaded to the server, and the server determines a posted content located at the sliding coordinates of the viewport from the plurality of posted contents contained in the moment posted by the poster at the current time.

10. The information management method according to claim 9, wherein dynamically storing the plurality of posted contents contained in the moment posted by the poster at the current time to the posted information display module of the information post section comprises:
  packaging the plurality of posted contents contained in the moment posted by the poster at the current time in a corresponding information card in a preset format; and
  determining in real time, in response to the slide operation of the user, a posted content at the viewport in the moment, and dynamically storing the posted content at the viewport to the posted information display module of the information post section.

11. The information management method according to claim 9, wherein the personal information of the poster comprises the personal information of the poster in various dimensions.

12. The information management method according to claim 11, further comprising:

in the case that a plurality of posted contents are dynamically stored in the posted information display module in response to the slide operation of the user, zooming out personal information of the poster in a target dimension and hiding personal information in other dimensions; and dynamically displaying the posted content at the viewport in the moment posted by the poster at the current time in an entire display area of the information post section.

13. A display terminal, comprising:

at least one processor; and a memory apparatus configured to store at least one program;

wherein the at least one processor, when loading and running the at least one program, is caused to perform:

displaying an information post section of a poster in an information stream page; storing personal information of the poster to a personal information display module of the information post section; and dynamically storing a plurality of posted contents contained in a moment posted by the poster at a current time to a posted information display module of the information post section; wherein the plurality of posted contents contained in the moment posted at the current time, displayed in the posted information display module, are dynamically displayed at a viewport based on an upload order in which the plurality of posted contents are uploaded to a server within the current time, wherein the posted information display module displays a first information card corresponding to a first posted content in the moment posted by the poster at the current time and edges of a second information card corresponding to a second posted content; in a case where a user performs a slide operation, other posted contents constantly move and appear from a right edge of the posted information display module to be correspondingly displayed within a range of the posted information display module, sliding coordinates of the viewport corresponding to the slide operation are determined based on the slide operation and are uploaded to the server, and the server determines a posted content located at the sliding coordinates of the viewport from the plurality of posted contents contained in the moment posted by the poster at the current time.

14. A communication system, comprising a post terminal, the server, and the display terminal as defined in claim 13; wherein the post terminal is configured to upload the moment posted by the poster at the current time to the server; and the server is configured to search for an associated user of the poster, issue personal information of the poster to the display terminal of the associated user, and dynamically issue a posted content at a viewport of the display terminal in the moment posted by the poster at the current time to the display terminal.

15. The communication system according to claim 14, wherein the server is configured to dynamically issue the posted content at the viewport of the display terminal in the moment posted by the poster at the current time to the display terminal by: determining, in response to the slide operation reported by the display terminal, a viewport position corresponding to the slide operation, and issuing the posted content at the viewport in the moment posted by the poster at the current time to the display terminal based on the viewport position.

16. A non-transitory computer-readable storage medium storing at least one computer program, wherein the at least one computer program, when loaded and run by a processor, causes the processor to perform the information management method for the communication application as defined in claim 9.

17. The display terminal according to claim 13, wherein the at least one processor, when loading and running the at least one program, is caused to perform:

packaging the plurality of posted contents contained in the moment posted by the poster at the current time in a corresponding information card in a preset format; and determining in real time, in response to the slide operation of the user, a posted content at the viewport in the moment, and dynamically storing the posted content at the viewport to the posted information display module of the information post section.

18. The display terminal according to claim 13, wherein the personal information of the poster comprises the personal information of the poster in various dimensions.

19. The display terminal according to claim 18, wherein the at least one processor, when loading and running the at least one program, is caused to perform:

in the case that a plurality of posted contents are dynamically stored in the posted information display module in response to the slide operation of the user, zooming out personal information of the poster in a target dimension and hiding personal information in other dimensions; and dynamically displaying the posted content at the viewport in the moment posted by the poster at the current time in an entire display area of the information post section.

* * * * *